United States Patent Office
3,159,576
Patented Dec. 1, 1964

3,159,576
GREASE YIELDS
Dean W. Criddle, Pleasant Hill, Calif., assignor to California Research Corporation, San Francisco, Calif., a corporation of Delaware
No Drawing. Filed Aug. 3, 1962, Ser. No. 214,535
2 Claims. (Cl. 252—18)

This invention is directed to lubricating grease compositions, more particularly to the use of certain agents to improve the yield of calcium base greases. These particular calcium base greases contain particular ratios of calcium 12-hydroxy stearate, calcium acetate, calcium carbonate and calcium hydroxide in combination.

During the past few years, there has been a noticeable trend in the grease art to blend grease compositions which can be used for more than one purpose; that is, the usefulness of grease compositions has been extended. These multi-purpose lubricants are rapidly displacing special purpose grease compositions throughout all fields where greases are used, particularly in the field of industrial greases. The grease compositions of the prior art, in particular those described in the patents noted hereinbelow, are useful as multi-purpose greases to a limited degree only, mainly because prior art greases lack high film strength. Furthermore, it is known that the surfaces of such grease compositions of the prior art crust upon aging, making the grease undesirable for use. Contrary thereto, no crust forms on the surfaces of the grease compositions described herein, nor do the grease compositions harden upon aging.

The grease art describes well the use of calcium soaps of fatty acids (e.g., calcium 12-hydroxy stearate) as grease thickening agents, and the use of metal salts of low molecular weight fatty acids (e.g., calcium acetate) as modifying agents for such grease compositions (e.g., calcium acetate as a modifying agent in grease compositions thickened with calcium 12-hydroxy stearate). tate in amount of from 2 mols to 5 mols for each mol of calcium fatty acid soap grease compositions of high film strength are obtained by using large excesses of calcium acetate; that is, the calcium acetate/calcium fatty acid soap mol ratios must be at least 7 to 1, even as high as 40 to 1. Patentees point out that prior to their invention, greases having salt/soap mol ratios less than that noted had low film strength.

U.S. Patent No. 2,596,556 teaches that ureas can be used as a complexing agent in the preparation of water resistant, high temperature grease compositions, emphasizing that such greases must be neutral.

In contrast to the compositions described hereinabove, applicant's greases described hereinbelow have calcium acetate-calcium hydroxy-stearate mol ratios less than 5 to 1; and are basic. In the preparation of the grease compositions defined herein, it is necessary that the amount of basic compound is in excess of that sufficient to neutralize any saponifiable or salt-forming components.

Such grease compositions prepared according to the prior art, although they can be characterized as water resistant, high temperature greases, cannot be used where it is essential to have high film strength for proper lubrication of frictional surfaces.

Although, because of the uniqueness of the grease thickeners defined herein, smaller amounts of these grease thickeners are usually used to obtain greases having the desired consistencies for multi-purpose greases, the agents described hereinbelow still improve considerably the yield of such thickeners.

It is a primary object of this invention to describe certain agents which will increase the yield of calcium base thickeners to form grease compositions having exceptionally high film strengths and using low acetate-hydroxy stearate ratios.

In accordance with this invention, it has been discovered that grease yields are increased by the addition of certain quaternary ammonium compounds to grease compositions containing in combination a calcium soap of 12-hydroxy stearic acid (or its equivalent), calcium acetate in amount of form 2 mols to 5 mols for each mol of said calcium soap of 12-hydroxy stearic acid, excess base expressed as calcium hydroxide, and calcium carbonate in amounts sufficient to impart improved consistency to said grease composition, which calcium carbonate is obtained by reacting urea with calcium hydroxide.

Although the grease compositions have amounts of base (i.e., calcium hydroxide) in excess of that necessary for the neutralization of the acidic components used in the preparation of the grease, such base need not be present in the finished grease as calcium hydroxide. Although this excess base is expressed herein as free calcium hydroxide, such base may form basic salts, for example, basic calcium carbonate, basic calcium acetate, and basic calcium 12-hydroxy stearate. However, no theory is postulated herein to explain the possibility of basic salt formation.

The grease compositions described in this invention are water resistant, have high film strength, have improved work stability, and have excellent high temperature characteristics. The grease compositions formed according to this invention have ASTM dropping points as high as 700° F. and higher. Such greases can be used in steel mills, automobile and truck chassis, rock crushers, electric powered excavation equipment, shaking screens, cement plants, railroad service (particularly journal bearings), in aviation equipment, etc.

The quaternary ammonium compounds are of the formula

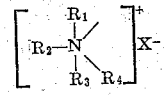

wherein $R_1$, $R_2$, $R_3$ and $R_4$ are aliphatic radicals having from 1 to 30 carbon atoms, preferably 1 to 22 carbon atoms (with the total number of carbon atoms in $R_1$, $R_2$, $R_3$ and $R_4$ combined being in the range of 4 carbon atoms to 120 carbon atoms, preferably 4 to 46 carbon atoms), and $X^-$ is selected from a group consisting of chloride ion and nitrite ion.

It is preferred that $R_1$ and $R_2$ are similar, each being an alkyl radical having from 1 to 4 carbon atoms, preferably 1 to 2 carbon atoms; and that $R_3$ and $R_4$ are similar, each being an alkyl radical containing from 10 to 30 carbon atoms, preferably 14 to 22 carbon atoms.

The quaternary ammonium compound is incorporated in the calcium base grease composition in amounts of 0.05% to 3%, by weight, preferably .1% to 1.0% by weight.

Such quaternary ammonium compounds are exemplified by cocotrimethyl ammonium chloride, lauryl trimethyl ammonium chloride; palmityl trimethyl ammonium chloride; tallow trimethyl ammonium chloride; dicocodimethyl ammonium chloride; trimethyl arachidyl-behenyl ammonium chloride; dimethyl diarachidyl-behenyl ammonium chloride; dimethyl dihydrogenated tallow ammonium chloride; dicocodimethyl ammonium nitrite, stearyl amine acetate, coco oil amine acetate, etc.

Such quaternary ammonium compounds are readily dispersed into the grease by adding the compound as a solution in a low-boiling alcohol. For example, 60% dicocodimethyl ammonium nitrite and 40% isopropanol can be readily dispersed in greases. The alcohol serves only as a means of dispersing the compounds uniformly throughout the grease.

As used herein, the term "calcium soap of 12-hydroxy stearic acid" also includes the calcium soap of hydrogenated ricinoleic acid.

The calcium 12-hydroxy stearate is used in amounts sufficient to thicken oils of lubricating viscosity to the consistency of a grease; that is, in amounts ranging from 5% to 25%, by weight, preferably 7% to 12%, by weight.

The calcium acetate is used in amounts of 4% to 25%, by weight, 6% to 12% by weight being preferred.

For the desired characteristics of the final grease composition, it is essential that the above-named components be present in the grease composition in certain proportions with respect to each other. For example, it is essential that the mol ratio of the calcium acetate to the calcium 12-hydroxy stearate have values less than 5; ranging preferably from 2 to 5; that is, that the calcium acetate/calcium 12-hydroxy stearate mol ratio be from 2:1 to 5:1.

The calcium carbonate present as a component in the final grease composition (which component increases the consistency of the grease) is obtained by the reaction of urea with calcium hydroxide during the preparation of the grease. Based on the finished grease, urea is used in amount of about 1.0% to about 6.0% by weight. Since 1 mol of urea is believed to react with 1 mol of calcium hydroxide to form the calcium carbonate, the finished grease composition thus prepared has from about 1.7% to about 10.0%, by weight, of calcium carbonate; preferably about 2.0% to about 6.0%, by weight.

It is essential that the calcium hydroxide be used in an amount in excess of that necessary to form calcium 12-hydroxy stearate from the 12-hydroxy stearic acid, calcium acetate from the acetic acid, and calcium carbonate from reaction with urea. The excess calcium hydroxide is such that the finished grease has from 1% to 8%, by weight, of excess base expressed as calcium hydroxide.

In the preparation of the grease described in U.S. Patent No. 2,596,556 noted hereinabove, wherein urea is a complexing agent, there can be an excess of 0.1 to 3 equivalents of calcium hydroxide per equivalent of calcium 12-hydroxy stearate. However, in the preparation of the grease composition described herein, it is essential to use from 6 to 18 equivalents of calcium hydroxide per equivalent of calcium 12-hydroxy stearate.

Lubricating oils which are suitable as base oils for the grease compositions of this invention include a wide variety of oils, such as mineral oils, as exemplified by the naphthenic base, paraffin base, and mixed base oils derived from petroleum, including lubricating oils derived from coal products, etc.

The grease compositions of the invention can be prepared by blending the 12-hydroxy stearic acid (or the alkyl ester thereof) with an oil, and heating the blend sufficiently to disperse the acid in the oil. A large excess of calcium hydroxide (i.e., from 6 to 18 equivalents per equivalent of 12-hydroxy stearic acid) is then added and the whole mixture stirred to obtain a uniform dispersion of the resulting soap in the oil. The mixture is then heated to a temperature of about 180° F., after which the acetic acid is added slowly. The whole mixture is stirred for a period of time sufficient to obtain a smooth dispersion, after which the urea is added, and the mixture is heated to a temperature ranging from about 320° F. up to about 450° F. under a pressure of 70 to 95 p.s.i. This pressure range, which is not critical, is maintained by bleeding into the atmosphere the ammonia formed during the conversion of the urea. The mixture is then heated to about 320° F. at atmospheric pressure for the purpose of completing the reaction, at which time the alcoholic solution of the quaternary ammonium compound may be added. The alcoholic solution of quaternary ammonium compound may also be added after the grease has cooled to ambient temperatures. The quaternary ammonia compounds are most efficient to stiffen the greases when they are added at temperatures of about 200° F. and the greases are then milled at high shear rates, as in a Manton Gaulin homogenizer.

The examples hereinbelow illustrate the preparation of grease compositions of this invention.

EXAMPLE I

A mixture of 7.9%, by weight, of 12-hydroxy stearic acid and about 45%, by weight, of a California solvent refined paraffinic base oil having a viscosity of 480 SSU at 100° F. was heated to a temperature of 130° F. 15% of hydrated lime was then added and the mixture was agitated at 130° F. for a period of time sufficient to form a uniform blend. The whole mixture was heated to 180° F. and maintained at that temperature for a period of 30 minutes, after which 8%, by weight, of acetic acid was added slowly during a period of 30 to 45 minutes. 10% of the same oil described hereinabove was then added, after which there was added 2.2%, by weight, of urea, and the mixture was heated to 320° F. at a pressure of 70–90 p.s.i. for a period of one hour. The whole mixture was then heated at 330° F. at atmospheric pressure, followed by the addition of 1.5% of oxidation and rust inhibitors, 1% of a solution of 40% dicoco dimethyl ammonium nitrite in isopropanol, and the remainder of the oil to make 100%. The mixture was milled in a Manton Gaulin homogenizer at 5,000 p.s.i.

As exemplified hereinbelow in Example II, the grease may also be prepared by the use of an ester of 12-hydroxy stearic acid.

EXAMPLE II

A mixture of 7.9% of methyl 12-hydroxy stearate and 45% of a California solvent refined paraffinic base oil having a viscosity of 480 SSU at 100° F. was blended at room temperature, then heated to a temperature ranging from 180° F. to 190° F. The mixture was then cooled to a temperature of 180° F. to 190° F. for a time sufficient to disperse the methyl 12-hydroxy stearate in the oil. The mixture was then cooled to 130° F. followed by addition of 15% by weight of calcium hydroxide, after which the mixture was agitated at 130° F. to obtain a uniform dispersion in the oil. There was then added 0.1% sodium hydroxide (added as 1% sodium hydroxide in water, used herein as a catalyst), and the whole mixture was heated to 180°–200° F. for a period of 30 minutes, after which 8.0% of glacial acetic acid was added over a period of time of about 30–45 minutes. At this point there may be added 10%, by weight, of the lubricating oil described hereinabove. 2.2%, by weight, urea was then added at 180° F., followed by sealing the mixture from the atmosphere and heating to 320° F. at 70–90 p.s.i. for a period of about one hour. The mixture was then vented to the atmosphere and heated at 330° F. for a period of one hour at atmospheric pressure, followed by the addition of 1.5% of oxidation and rust inhibitors, 3% of a solution of 40% lauryl trimethyl ammonium chloride in isopropanol, and the balance of the oil to make a total of 100%. The mixture was milled in a Manton Gaulin homogenizer at 5,000 p.s.i.

The beneficial effect of quaternary ammonium compounds in the grease composition hereinabove described in Examples I and II also is obtained in similar compositions which are essentially anhydrous. For example, a base grease similar to that described in Example I but processed at a maximum temperature of 430° F. to give an essentially anhydrous grease, was stiffened effectively by 1% of a 40% alcohol solution of cocotrimethyl ammonium nitrite. The quaternary ammonium compound decreased the ASTM Worked Penetration of this anhydrous grease from 314 to 261, and the ASTM Unworked Penetration was decreased from 265 to 172.

Table I hereinbelow sets forth the components used in the preparation of greases to which were added the quaternary ammonium compounds.

Table I

Components used in preparation
of grease base:                                    Wt. percent
(1) Methyl 12-hydroxy stearate _____    7.2
(2) Glacial acetic acid _____    7.3
(3) Urea _____    2.0
(4) Hydrated lime _____    13.7
(5) Sodium hydroxide _____    [1] 0.1
(6) Base oil _____    68.7
(7) Oxidation and rust inhibitors _____    1.0

[1] Catalyst.

Table II hereinbelow illustrates the effectiveness of the quaternary ammonium compounds in increasing the yield of the calcium greases described herein. The grease is the grease of Table I hereinabove. In each instance, the addition of the additive to the base oil yielded a composition having the same penetration as the base oil itself.

Additive "A" was dicoco dimethyl ammonium nitrite
Additive "B" was coco trimethyl ammonium chloride
Additive "C" was lauryl trimethyl ammonium chloride
Additive "D" was palmityl trimethyl ammonium chloride
Additive "E" was tallow trimethyl ammonium chloride
Additive "F" was trimethyl arachidyl-behenyl quaternary ammonium chloride
Additive "G" was dimethyl diarachidyl-behenyl quaternary ammonium chloride

Table II

| Composition | ASTM Penetrations | |
|---|---|---|
| | Worked (P 60) | Unworked (Po) |
| Grease No. 1: | | |
| Base Oil | >600 | >600 |
| Base Oil +1% Additive[1] | >600 | >600 |
| Grease Base | 319 | 277 |
| Grease Base +1% Additive A | 265 | 207 |
| +3% Additive A | 306 | 146 |
| +33% Oil[2] and 1% Additive A | 333 | 278 |
| +3% Additive B | 252 | 135 |
| +3% Additive C | 297 | 174 |
| +3% Additive D | 289 | 168 |
| +3% Additive E | 294 | 174 |
| +3% Additive F | 260 | 193 |
| +3% Additive G | 278 | 138 |

[1] Any one of the Additives A to G.
[2] Paraffinic Base Oil—500 SSU at 100° F.

The quaternary ammonium compounds described hereinabove have no effect on the yields of calcium stearate greases. For example, the addition of 2% of Additive A to a grease composition thickened with 10.5% calcium soap of tallow fatty acids had no effect whatsoever on the penetration values.

I claim:
1. A grease composition comprising a major proportion of a mineral oil of lubricating viscosity, from 7% to 12% by weight of calcium 12-hydroxy stearate, from 6% to 12% by weight of calcium acetate, from about 1.0% to about 8% by weight of calcium hydroxide, from 1.7% to about 10.0% by weight of calcium carbonate, wherein said calcium acetate is present in an amount of from 2 moles to 5 moles per mole of calcium 12-hydroxy stearate, and from 0.1% to 1.0% by weight of a quaternary ammonium compound of the formula:

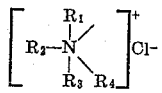

wherein $R_1$ and $R_2$ are alkyl radicals each containing from 1 to 4 carbon atoms, and $R_3$ and $R_4$ are alkyl radicals each containing from 10 to 30 carbon atoms.

2. A grease composition comprising a major proportion of a mineral oil of lubricating viscosity, from about 7.0% to about 12.0% by weight of calcium 12-hydroxy stearate, from 6.0% to about 12.0% by weight of calcium acetate, from 1.7% to about 10.0% by weight of calcium carbonate, from 1.0% to 8.0% by weight of calcium hydroxide, wherein the mole ratio of said calcium acetate to said calcium 12-hydroxy stearate has a value from 2 to 5, and said calcium carbonate is derived from the reaction of urea with calcium hydroxide, and from 0.1% to 1.0% by weight of a quaternary ammonium compound of the formula:

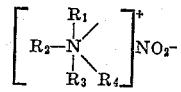

wherein $R_1$ and $R_2$ are alkyl radicals each having from 2 to 4 carbon atoms, and $R_3$ and $R_4$ are alkyl radicals having from 10 to 30 carbon atoms each.

References Cited in the file of this patent
UNITED STATES PATENTS

| 2,417,428 | McLennan | Mar. 18, 1947 |
| 2,595,556 | Worth et al. | May 6, 1952 |
| 3,007,866 | Chamberlin | Nov. 7, 1961 |

OTHER REFERENCES

The Chemistry of Fatty Amines, by Armour and Company, December 1948, 18 pp.

UNITED STATES PATENT OFFICE
CERTIFICATE OF CORRECTION

Patent No. 3,159,576 December 1, 1964

Dean W. Criddle

It is hereby certified that error appears in the above numbered patent requiring correction and that the said Letters Patent should read as corrected below.

Column 1, line 39, strike out "tate in amount of from 2 mols to 5 mols for each mol of" and insert instead -- U. S. Patent No. 2,842,495 teaches that calcium acetate- --.

Signed and sealed this 6th day of April 1965.

(SEAL)
Attest:

ERNEST W. SWIDER
Attesting Officer

EDWARD J. BRENNER
Commissioner of Patents